United States Patent [19]
Durbin et al.

[11] Patent Number: 6,039,258
[45] Date of Patent: Mar. 21, 2000

[54] HAND-HELD PORTABLE DATA COLLECTION TERMINAL SYSTEM

[75] Inventors: Dennis A. Durbin, Cedar Rapids; Arvin D. Danielson, Solon, both of Iowa

[73] Assignee: Norand Corporation, Cedar Rapids, Iowa

[21] Appl. No.: 08/896,558

[22] Filed: Jul. 17, 1997

Related U.S. Application Data

[60] Provisional application No. 60/022,147, Jul. 18, 1996.

[51] Int. Cl.$^7$ ........................................................ G06K 7/10
[52] U.S. Cl. .................... 235/472.01; 235/456; 235/463; 235/447; 235/477
[58] Field of Search ......................... 235/472.01, 462.01, 235/439, 470, 440, 454, 456, 463, 447, 477, 462.09, 462.3

[56] References Cited

U.S. PATENT DOCUMENTS

| | | | |
|---|---|---|---|
| 3,911,416 | 10/1975 | Feder | 340/311 |
| 4,443,694 | 4/1984 | Sanford | 235/465 |
| 4,916,308 | 4/1990 | Meadows | 250/221 |
| 5,144,120 | 9/1992 | Krichever et al. | 235/472 |
| 5,221,838 | 6/1993 | Gutman et al. | 235/379 |
| 5,369,262 | 11/1994 | Dvorkis et al. | 235/472 |
| 5,414,251 | 5/1995 | Durbin | 235/462 |
| 5,536,930 | 7/1996 | Barkan et al. | 235/472 |
| 5,684,287 | 11/1997 | Walts | 235/462 |
| 5,783,812 | 7/1998 | Chung | 235/472 |
| 5,834,749 | 10/1998 | Durbin | 235/454 |

*Primary Examiner*—Thien M. Le
*Assistant Examiner*—Daniel S. Felten
*Attorney, Agent, or Firm*—Suiter & Associates PC

[57] ABSTRACT

A hand-held portable data collection system integrates ideal design features to improve and optimize the data collection process. The operator interface of the hand-held portable data collection system incorporates somatic feedback between the hand-held portable data terminal and the operator, thereby facilitating operation of the data terminal such as reading of optically readable indicia. The hand-held portable data collection system further provides optimal data collection by allowing for variable orientation of the reading field of view of the data file reader allowing for optimal positioning of the reader during the data collection process. Optically readable indicia may be disposed within the reading field of view of the data file reader without having to sight along the terminal as is typical with prior aim and shoot type data readers. The optically readable indicia may be readable regardless of orientational disposition.

100 Claims, 10 Drawing Sheets

HAND-HELD PORTABLE DATA COLLECTION TERMINAL SYSTEM

CROSS-REFERENCE TO RELATED APPLICATIONS

The present application claims the benefit, under 35 USC 119(e), of the United States Provisional Application Ser. No. 60/022,147, filed Jul. 18, 1996 (38237+). Said Provisional Application is incorporated herein in its entirety.

The present application incorporates by reference thereto the following applications in their entirety: U.S. application Ser. No. 08/298,257 filed Aug. 30, 1994; U.S. application Ser. No. 08/300,178 filed Sep. 2, 1994; U.S. application Ser. No. 08/303,333 filed Sep. 9, 1994; U.S. application Ser. No. 08/616,469 filed Mar. 19, 1996; U.S. application Ser. No. 60/004,813 filed Oct. 4, 1995; U.S. application Ser. No. 60/002,142 filed Aug. 17, 1995; U.S. application Ser. No. 08/461,605 filed Jun. 5, 1995. All of said incorporated applications are subject to assignment to the assignee of the present application.

TECHNICAL FIELD

The present invention relates generally to data collection systems and more specifically to hand-held portable data collection systems having somatic feedback between a data terminal and an operator.

BACKGROUND OF THE INVENTION

Data collection systems have historically been utilized for automated data capture in a variety of applications ranging from inventory management and control, route accounting, electronic exchange of product and price information, parcel delivery and invoicing. Hand-held portable data collection systems permit in field data collection for up-to-date information processing.

State of the art data collection systems incorporate high technology computer systems which have simultaneously increased in performance and decreased in size, allowing computing power previously available only in desktop sized or larger systems to be available in portable hand-held or vehicle mounted units.

The invention of the bar code bypassed manual data entry systems in favor of high speed, reliable automatic data entry. Automatic bar code reading has become the most efficient and widely utilized form of data collection in data collection systems.

Portable data collection terminals are often used in industrial environments having high levels of background noise. It is often desired to provide a feedback signal to the operator during the data collection process to communicate operational information to the operator concerning the state of the data collection process. For example, the data collection terminal may be utilized to read information and data encoded in optically readable indicia such as a bar code. During the reading process, the data terminal may provide an audible signal such as a beep or a buzz produced by a speaker integrated with the data terminal upon a successful reading operation. The data terminal may also produce visual signals such as illumination of one or more LEDs, for example.

However, audio signals produced by a speaker or similar audio transducer element integrated in a portable hand-held device are typically too weak to be heard and relied upon in a high decibel background noise environment. Loud background noises interfering with a data terminal generated audio signal may be produced by various industrial machinery e.g., trucks, forklifts, compressors, generators, refrigerators, etc. The audio signal may be further muffled and attenuated by the apparel and accessories worn by the operator, e.g., hats, hard hats, helmets, hoods, cold protection earmuffs or noise reducing earplugs or earmuffs required to be worn under OSHA regulations to protect worker ears in high ambient noise level environments. Additionally, the amount of light produced by small LEDs may be washed out by bright sources of ambient illumination especially in an outdoor environment. Often the attention of the operator is directed away from the data terminal and toward some other object or task. As a result, the visual light signals fail to attract the attention of the operator. It is therefore desirable to have a communications system integrated with a portable data terminal which provides data collection feedback information to the operator which does not suffer interference of the feedback signal from environmental conditions.

SUMMARY OF THE INVENTION

The present invention provides an improved hand-held portable data collection terminal system which incorporates a novel, user optimized data collection system which improves the interface between the data terminal and the terminal operator.

One feature of the present invention is a user optimized somatic communications system for interfacing with the operator during the scanning process. The communications are somatic in that the path for the communications is through the body of the operator, rather than through some other medium such as light waves or sound waves. Thus, the operator is provided with a tactile stimulus detected by the body of the operator through the sense of touch, for example, to indicate various aspects of the data collection process such as indicating to the operator whether the data collection process has been successful or that further data collection is required.

A further object of the present invention is to provide a portable data collection terminal that allows for ideal data collection by optimization of the scanning or imaging angle with respect to the orientation of the terminal in the operator's hand wherein no aiming or sighting along the terminal or reader is required. The optimal scanning or imaging angle is preferably non-orthogonal, or not perpendicular, with respect to the orientation of the terminal. The operator may quickly and efficiently scan or image indicia by performing data collection at an optimum ideal position such as near-hip level scanning or imaging of optical indicia.

Yet another object of the present invention is to provide a portable hand-held data collection terminal system which may be tailored to the skill level and data collection techniques of a particular terminal operator. The data collection interface may dynamically learn the idiosyncrasies of the operator and adjust the operation of the data collection unit accordingly, or the parameters of the operator may be manually programmed into the data collection unit.

It is a further object of the present invention to provide a portable indicia reader system which dynamically assists the operator in the data collection process. Various feedback signals regarding the state of the data collection process are indicated to the operator such that the proper response may be taken to successfully complete a reading of optically readable indicia.

It is yet another object of the present invention to provide a hand-held portable indicia reading system which is capable of non-orthogonal, non-perpendicular, indicia reading. Non-orthogonal, non-perpendicular, indicia reading is provided to ideally optimize the position of the indicia reader terminal with respect to the operator in view of the relative position of the indicia.

It is an additional object of the present invention to provide a hand-held indicia reading system having a display which is at an optimal viewing angle with respect to the operator during the reading of indicia. The display may be utilized to provide the user with information concerning the indicia and the reading process, and may further assist the reader in the reading of the indicia.

BRIEF DESCRIPTION OF THE DRAWINGS

The numerous objects and advantages of the present invention may be better understood by those skilled in the art by reference to the accompanying figures in which.

DETAILED DESCRIPTION

Figure 1:
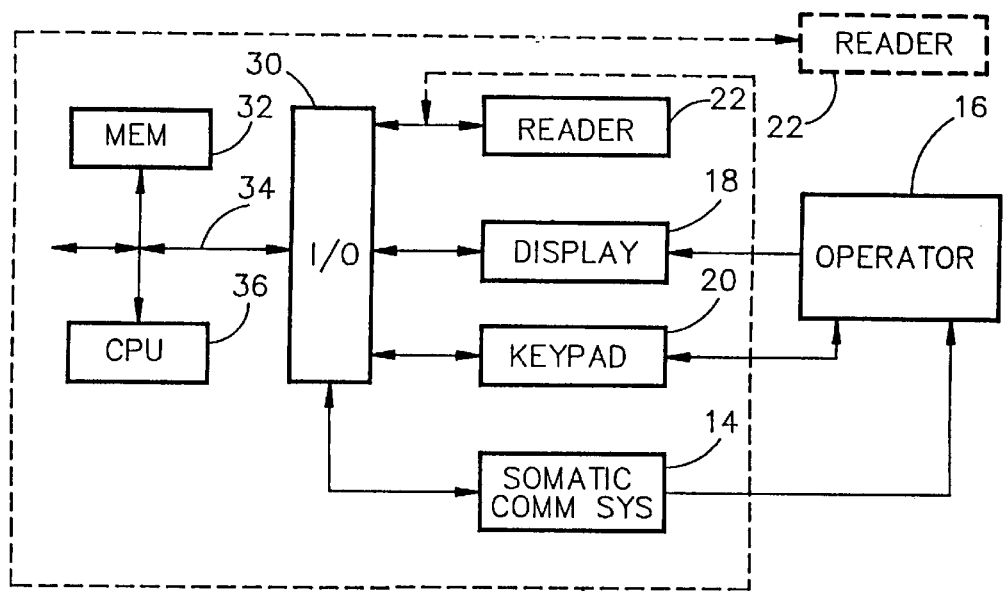
FIG. 1 is a schematic diagram of the hand-held portable data collection system of the present invention showing further components thereof.
Figure 2:
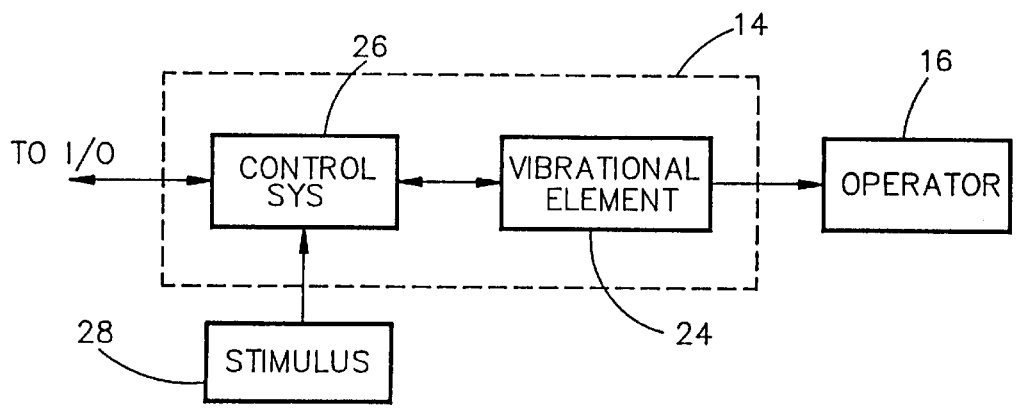
FIG. 2 is a schematic diagram of the present invention showing system components of the somatic communications system.

FIGS. 1 and 2 depict a hand-held portable data collection system consistent with the present invention. The hand-held data collection system 10 comprises a hand-held portable data collection terminal 12 for portable data collection and acquisition and a somatic communications system 14 for producing a signal which is tactually detectable by the operator 16 of the system 10. Typically, the hand-held portable data terminal 12 is designed to be operated from battery power and includes several data input and control systems. The data terminal 12 has a display 18 for displaying information thereon. The displaying of information on the display provides user control of the data terminal through the operating system.

A keyboard or keypad 20 may be provided for manual entry of data and control commands into the data terminal 12. Further, a touch screen or digitizing layer may be integrated with the display 18 for touch input of data and control commands into the terminal 12 through manual touch, or a passive, active or inductive input stylus, for example. The stylus may be a light pen or a pen type bar code reader which can collect data by passing the bar code reader pen across the bar code surface. Various other data collection systems may be included with the data terminal as well, such as voice input, modem or wireless modem, RF and infrared communications systems, to name a few.

As illustrated in FIG. 1, the data terminal 12 of the present invention may include basic functional units such as an input and output system or bus 30, memory 32, signal routing circuits 34, and a central processing unit 36, for example. Other system components implementing necessary or desired features may be included in the data terminal 12 as well.

The hand-held data terminal 12 may include various other types of data collection systems as well. A hand-held indicia reader 22, scanner or similar data collecting unit may be tethered to the data terminal via a cord or wire link. Alternatively, the tethered reader (or scanner) 22 may communicate with the data terminal 12 via a wireless link such as infrared or radio frequency communications. The tethered scanner 22 may receive power from the power source or battery of the data terminal, or may include its own self contained power source or battery. The tethered data collection unit may utilize various types of indicia reading systems (e.g., laser scanner, CCD reader, RF tag reader, etc.). Examples of a tethered data reader may illustrated by reference to U.S. Pat. No. 3,991,299 issued Jan. 28, 1974 to Chadima et al. (e.g., FIG. 1) or to U.S. Pat. No. 4,570,057 to Chadima et al. (e.g., FIG. 1). Said U.S. Pat. Nos. 3,991, 299 and 4,570,057 are hereby incorporated herein by reference in their entireties.

As shown in FIG. 1, the data collection systems may be integrated within the data terminal 12 itself, thereby forming a single unit portable data collection system 10. For example, a data file reader 22 may be designed into the top edge 102 or bottom surface 104 of the data terminal 12. Operation of the data collection system 10 may be implemented through the user interface of the data terminal 12, by keyboard or keypad input, touch screen input or voice input, for example.

The hand-held portable data collection system 10 of the present invention may include a somatic communications system 14 operatively integrated with the data terminal 12 to provide tactual communication with the operator 16 of the data terminal 12. The somatic communications system 14 provides a signal which is detectable by the operator's sense of touch 16 during hand-held utilization of the data terminal. The somatic communications system 14 may be utilized as a feedback path from the data terminal 12 to the operator 16 wherein information concerning the operation of the data collection system 10 may be communicated to the operator 16 to assist in the data collection process and may further be an extension of the operating system.

The operator's sense of touch can be stimulated by, for example, vibrational movements of various intensities, frequencies and durations. The operator could also be signaled by means of a single movement of a portion of the terminal. Alternatively or additionally, a small body mounted remote device could be used to transmit signals to the operator's sense of touch. The remote device can be in wired or wireless communication with the terminal. A wireless link, for example, can be an infrared (IR) or a radio frequency (RF) link. The link can provide one-way communication from the terminal to the remote device. The remote device can also contain a microphone, a speaker, or both (or an electroacoustic transducer which functions as both a microphone and a speaker). In such an embodiment, a two-way system would be required.

The remote device could be mounted at various locations on the body of the operator. It would be especially useful for operators wearing gloves, for example. It is also useful for situations where it is not desirable to cause a vibration of the terminal. In one embodiment, the remote device may be an integrated headphone and microphone headset wherein the somatic communications system provides signals to the operator that are audibly intelligible (e.g., recognizable tones, synthesized speech or digitized speech). Further, the operator may communicate with the terminal by voice input into terminal wherein control is effectuated by voice commands. The operating system may include voice recognition software which may be further tailored to operate the reader entirely from voice input.

Another embodiment of the somatic communications system may be implemented with custom designed gloves electrically connected to the data terminal. Each finger of the gloves may include a separately addressable somatic transducer wherein each digit of the operator's hands may be individually signaled by the somatic communications system to signal corresponding operational information. Thus, by signaling specific digits, specific information may be thereby communicated to the operator via the somatic communications system.

For example, information concerning the operation of the data terminal 12 while performing data collection functions is typically communicated to the operator 16 via visual or audio communications such as LEDs on the terminal 12 or information displayed on the display 18, or sounds produced by a buzzer or speaker. However, visual communications often may require the operator 16 to focus his attention on the data terminal 12 or the display 18 exclusively, thereby distracting his sight away from the data to be collected, e.g., a bar code. Audio signals may be difficult to detect in industrial environments having high decibel background noise. A tactual vibrational signal produced by the somatic communications system 14 is easily detected in such environments and does not require the operator 16 to direct his attention away from the data collection target at hand.

Figure 3:
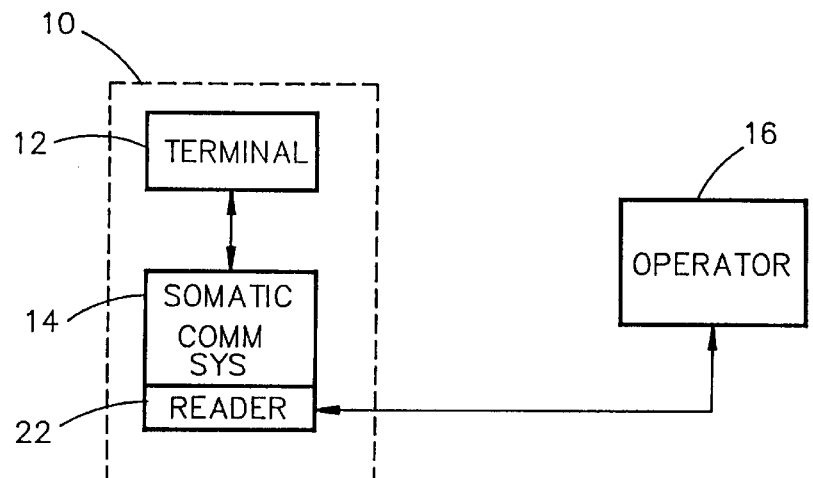
FIG. 3 illustrates the integration of a data file reader with the somatic communications system of the present invention.
Figure 4:
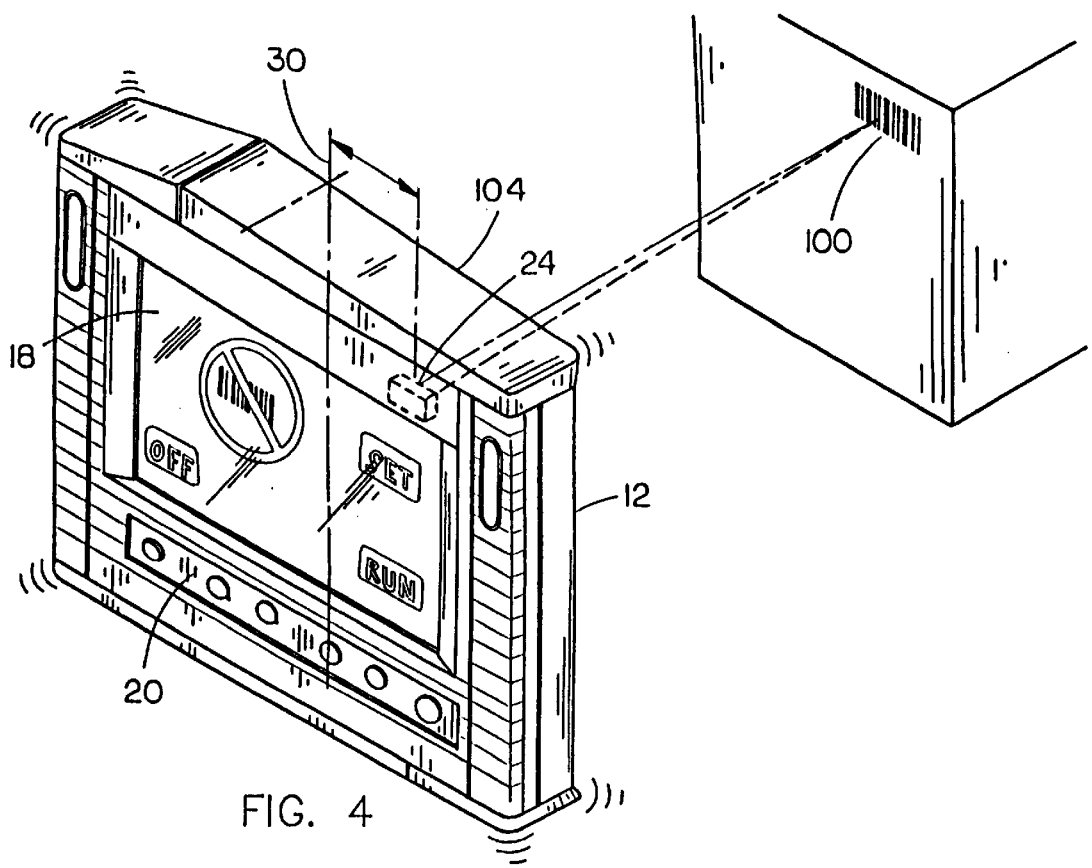
FIG. 4 is an isometric illustration of the present invention showing a placement of the vibrational element of the somatic communications system.
Figure 5:
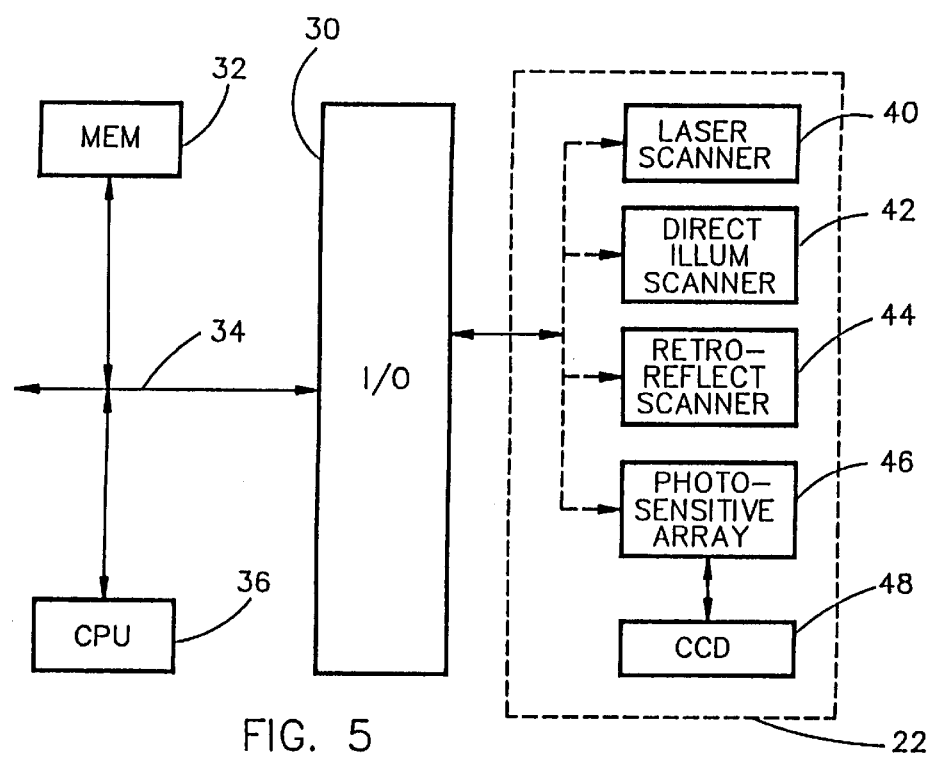
FIG. 5 is a schematic diagram of the present invention illustrating various types of data file readers which may be used with the invention.

As shown in FIGS. 3, 4 and 5, the somatic communications system 14 includes means for producing a vibrational signal that may be detected by the operator 16 through vibration of the data terminal 12. An oscillating or reciprocating element 24 may produce such a vibration in the terminal 12. The somatic communications system 14 may be placed off an axis 38 corresponding to a center of mass axis of the data terminal 12 in order to enhance and augment the vibrational signals and vibration of the data terminal 12. By increasing the distance at which the vibration producing element is placed off a center of mass axis 38, the torque produced by the vibrational element 24 is increased which translates the signal to the operator at a greater signal strength.

As an example of a type of vibrational element 24 that may be utilized to produce a vibrating signal may be of the type shown in U.S. Pat. No. 3,911,416 issued Oct. 7, 1975 to Feder. The vibrational element disclosed by Feder is the type utilized in a remote pager for silent call paging. The vibrational element may be an electric motor with a pivotally mounted weight at the end of the shaft of the motor. The pivotally mounted weight is disposed such that the initial torque load appearing to the motor is small to minimize start up current, while the weight may pivot to a maximum distance away from the shaft to maximize vibration at full rotational speed. Alternatively, other vibrational elements 24 may be utilized to produce mechanical vibrations, such as a piezoelectric substance (e.g., quartz, Rochelle salts, or various artificial materials). Applying an electrical signal to the piezoelectric material induces the material to mechanically vibrate. Utilization of piezoelectric materials may allow for better integration of the vibrational element 24 with the housing of the terminal 12. For example, the vibrational element may be directly molded or comolded into or with the housing during manufacture, etc.

Multiple vibrational elements 24 may be utilized simultaneously to increase the amount of information provided to the operator. For example. A first vibrational element 24 may be placed on the left side of the data terminal 12 while a second vibrational element 24 may be placed on the right side of the data terminal 24. Such an arrangement would produce localized vibrations on either the left of the right of the terminal. The localized vibrations may be utilized to assist the operator in aiming the reading field of view 54 of the reader 22 upon an indicia 100 (see FIGS. 7A and 7B for example). Further, a specialized glove may be fashioned, for example, in which each finger tip of the glove has a miniaturized, individually addressable vibrational element to further enhance the information capabilities of the somatic communications system 14. By selectively addressing individual fingers, specific information may be thereby communicated to the operator. For example, addressing the right index finger may indicate that an indicia 100 is disposed in the reading filed of view 54 of the reader 22, and addressing the left index finger may indicate a successful reading of the indicia 100, etc.

In FIG. 3, the vibrational element 24 (see FIG. 2) of the somatic communications system 14 may include the motional element of a data file reader 22 integrated with the terminal 12. For example the data file reader 22 may be a laser scanner 40 or other type of indicia reader which includes an oscillating or reciprocating element utilized to sweep or raster the laser beam across optically readable indicia, e.g. a bar code.

The vibrational element 24 of the somatic communications system 14 as shown in FIG. 2 may be disposed in a local position on the data terminal 12 wherein the entire terminal is not caused to vibrate by the production of signal from the somatic communications system 14. A small sized vibrational element 24 may be located in a hand grip portion of the data terminal 12 produces a localized signal which is discernible through the operator's fingertips, for example. Multiple local vibrational elements 24 may be placed at various strategic locations on the data terminal 12 to accommodate various grips and handedness of the operator to facilitate scanning techniques. For example, vibrational elements 24 may be placed on the top edge 58, bottom edge 60, left edge 62 and right edge 64 of the terminal shown in FIG. 7A to accommodate the operator's particular scanning techniques. In order to avoid activating vibrational elements 64 located in ungripped portion of the data terminal 12, the user may select which of the vibrational elements 24 will be actuated by the somatic communications system 14.

In reference to FIG. 4, the reciprocating element or elements of the data file reader 22 may be designed without vibration dampening elements and may be fixed directly to a support surface in the housing of the data terminal 12 in order to facilitate transfer of vibrational energy to the data terminal 12 and thereby ultimately to the operator 16. The data file reader 22 may be a laser scanner 40 having moving mirrors or reflective surfaces or penta-bimorph elements. The laser scanner may be a direct illumination scanner 42 wherein the lasing element itself is reciprocated or oscillated to achieve sweeping movement of the laser beam without any reflective surfaces interposed in the laser beam path.

The data file reader may also be a retro-reflective scanner 44 wherein the laser beam receiving elements are oscillated with the oscillation of the lazing element. Additionally, the data collection system may include a photosensitive array 46 such as a charge-coupled device (CCD) 48 having a moving lens or mirror system for focusing the image on indicia 100 upon the array. The motion of focusing lens or mirror elements of the reader 22 may utilized to produce the vibrational signals of the somatic communications system 14.

As shown in FIG. 2, the somatic communications system 14 may operate to produce an output signal to the operator 16 in response to an input stimulus 28 received by the data terminal 12. For example, the input stimulus 28 may be the actuation or triggering of a data collection key or touch input from the display. The input stimulus 28 may be the detection of optically readable indicia 100 (e.g., a bar code) disposed within the reading field of view of the data file reader. Further, the input stimulus 28 may be received from optically readable indicia 100 read by the data file reader 22. For example, the indicia 100 may contain relevant information that triggers a vibrational signal to the operator 16 indicating the receipt of the information into the data collection system 10.

The operation of the somatic communication system 14 in response to a an input stimulus 28 may be illustrated by the following example. A parcel delivery person may be looking for a specific parcel known to be located on his delivery vehicle, the identity of which is unknown, not readily available or marked on the parcel (e.g., it is desired to quickly locate the parcel on his vehicle which was shipped from Boston to Chicago). The parcel operator may rapidly scan the indicia on the parcels of his truck until he locates the correct parcel with the data collection system being programmed to indicate the location of the desired parcel by activation of the somatic communications system upon receiving the input stimulus 28 of the desired information in the form of data read by the data file reader 22.

Figure 6:
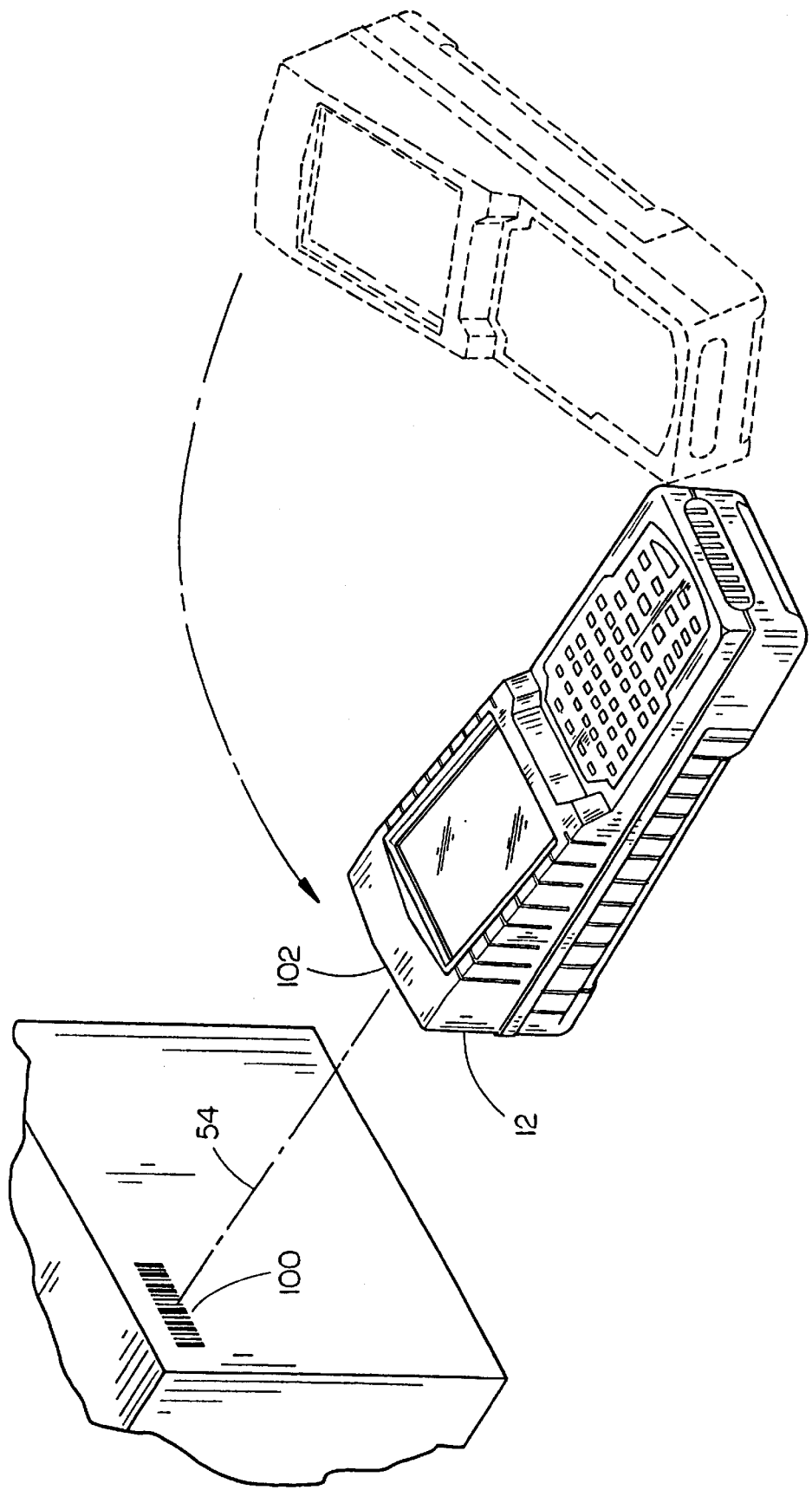
FIG. 6 illustrates movement of the hand-held data collection system of the present invention mobilizing a data terminal for activation of the data file reader.

FIG. 6 illustrates how output from the somatic communication system 14 may be communicated to the operator 16 upon movement of the hand-held portable data terminal 12 wherein the data terminal contains movement sensors. For example, such movement may be characteristic of movement typically occurring immediately prior to data collecting operation of the hand-held data terminal (i.e. mobilization of the data terminal from an inactive position to an active position). Further, the movement of the terminal 12 may be characteristic of movement typically occurring during data collecting operation or after data collection operation of the data terminal. For example, the somatic communications systems 14 may detect the motion of the data terminal from a dormant, inactive position to a position which indicates that the data collection process has been initiated. This somatic communications system then indicates to the operator through the vibrational movement that the data terminal is operational to collect data (e.g. read a bar code). Such movement may occur when the operator removes the data terminal 12 from a holster to an operational position. The vibrational signal may also communicate to the operator that a data collection function has been successful. The vibrational signal may further indicate the termination of the data collection process, and unsuccessful attempt, etc. The hand held portable data collection system 10 may be operated according to a method of operation which assists the operator 16 during the data collection process. A hand-held portable data collection terminal 12 is typically carried on the body of the operator 16 during non-use or standby operation thereof. The data terminal 12 is mobilized for action by a motion bringing the terminal from a standby position to an active position. The active position may be characterized by the data terminal having the reading field of view 54 of the data file reader 22 of the terminal 12 roughly disposed on or in the vicinity of optically readable indicia 100 to be read.

The data file reader 22 is on standby or inactive previous to the mobilization of the data terminal to conserve battery energy. Upon termination of the movement which mobilized the data terminal 12, the data file reader 22 is activated and ready to commence data collection. The optically readable indicia 100 is then read by the data file reader 22, and the reading of the indicia 100 is terminated upon a successful reading thereof.

Prior to the termination of reading the indicia 100, the data collection system 10 may indicate to the operator 16 the successfulness of the reading of the indicia 100. Such indication may be effectuated by the somatic communications system 14 (e.g., a vibrational signal is produced corresponding to a successful reading) or by visual indication on the display 18, which is operable and viewable during the indicia 100 reading process. Other information may be similarly indicated to the operator 16, such as the unsuccessfulness of the reading step, the required adjustment of the terminal 12 to obtain a successful reading, etc. The terminal 12 may then be readjusted by operator initiative or according to indicated adjustment information. The reading process may then continue until a successful reading of the indicia 100 is accomplished.

A typical operation might be as follows: The operator directs the data terminal 12 toward optically readable indicia 100. When the indicia 100 is disposed in the reading field of view 54 of the data file reader 22 and is recognized by the system, a quick series of 4–5 short burst pulses indicates the location of the indicia 100. The data file reader 22 then reads the indicia 100, and indicates to the operator 16 by producing a single, long duration vibrational signal, a successful reading. If the reading was unsuccessful, a short series of quick pulse bursts may indicate an unsuccessful reading. The operator 16 may then readjust the data terminal 12 and initiate another reading until the indicia 100 is successfully read.

The indicating of information to the operator concerning the operation of the data collection system 10 may occur at one or several of the steps in the method of operation of the system. For example, the somatic communications system 14 may indicate the execution of the activating step, the reading step, the indicating step or the terminating step by producing a tactually detectable vibrational signal so indicating.

As shown in FIG. 2, the somatic communications system 14 includes a vibrational control system 26 including vibration producing elements 24 for controlling the vibrational signal produced and transferred to the operator 16. The vibrational control system 26 controls the operating parameters of the somatic communications system 14, such as the strength, or amplitude, of the vibrational signal and the frequency, wave shape and harmonic content and fourier series components of the vibrational signals, for example. The vibrational control system may adjust and control the magnitude of the vibrational signal according to the sensitivity required by the operator. For example, an operator may be wearing gloves and thus require a stronger vibrational signal in order to detect the signal through the gloves.

The control of the somatic communications system 14 may be further implemented based upon various input stimuli 28 received by the hand-held data terminal 12. For example, icons, or graphical symbols, functioning as virtual keys, may be displayed on the display responsive to tactile input, a first icon for increasing the strength of the vibrational signal and a second corresponding icon for decreasing the strength of the vibrational signal (see FIG. 11 for example). Signal strength may be adjusted via other control means such as keypad input, voice control, or based upon an intelligent control program run by the data terminal 12 which monitors the responsiveness of the user based upon the strength of the vibrational signal. Thus the vibrational signal may be augmented or dampened to an optimal signal strength.

The various characteristics of the vibrational signal may be varied to communicate specific information to the operator 16. Further, the characteristics of the may be adjusted and optimized to meet the particular requirements and needs of the operator 16. For example, such vibrational characteristics as the duration, period, frequency, amplitude, shape, harmonic content, and fourier series of the vibrational signal may be varied to as required or as desired. High frequency pulses may indicate a successful data reading while low frequency pulses may indicate an unsuccessful reading.

The somatic communications system 14 may be operatively utilized to assist the operator in reading optically readable indicia 100. For example, a vibrational signal may be produced and communicated to the operator 16 to indicate an indicia 100 has been successfully read. A vibrational signal may be communicated to the operator 16 upon an indicia 100 being disposed within the reading field of view of the data file reader 22. A signal may further indicate the system is activated and ready to begin reading indicia 100.

Figure 8:
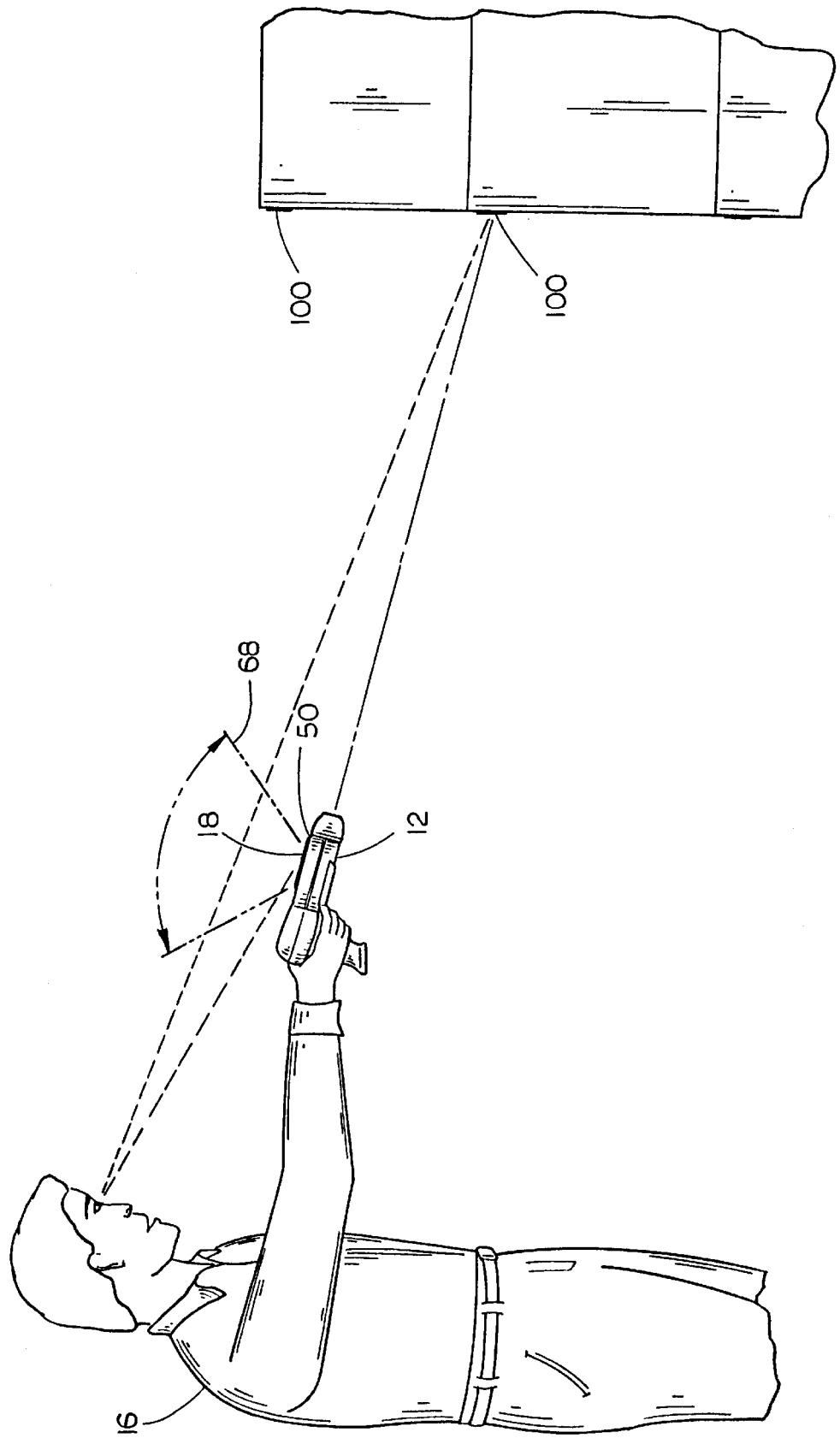
FIG. 8 illustrates an operator utilizing a pistol type data terminal.

In such a manner, the operator 16 is not required to sight along the terminal 12 to line up the reading field of view with the indicia 100 as is typical with prior readers such as shown in FIG. 8. Rather, the operator may position the data terminal by aligning the terminal based upon the receipt of vibrational signals when the indicia 100 is successfully disposed within the reading field of view. Such an approach allows the terminal 12 to be held by the operator 16 at a wide range of positions, for example near hip level. Further, the vibrational signal may indicate directional adjustment information to the operator 16 for needed adjustment of the terminal 12 to fully dispose the indicia 100 within the reading field of view e.g., a short pulse may indicate the need to move the terminal leftward and a long pulse may indicate the need to move the terminal rightward.

Further information concerning the data collection process may be indicated to the operator 16 by the somatic communications system 14. For example, a vibrational signal may indicate to the operator 16 reading of optically readable indicia 100 has initiated. A successful or unsuccessful reading of an indicia 100 may be indicated by the somatic communications system 14, or that multiple successive indicia 100 appearing in the reading field of view of the data file reader 22 are being read in succession, e.g., several indicia 100 appear in the reading field of view simultaneously and the reader 22 is reading all indicia 100 in rapid succession. Various other information may be communicated to the operator 16 as well, such as a vibrational signal corresponding to the termination of reading optically readable indicia 100, or a signal indicating that the indicia 100 is partially obscured or missing, thereby lacking a complete data file.

The somatic communications system 14 may be programmed to communicate various information to the operator 16. For example, the somatic communication system 14 may be utilized to indicate when the battery level is low, when there is a system error in the operating system, and other various alarm type of signals.

Figure 7A:
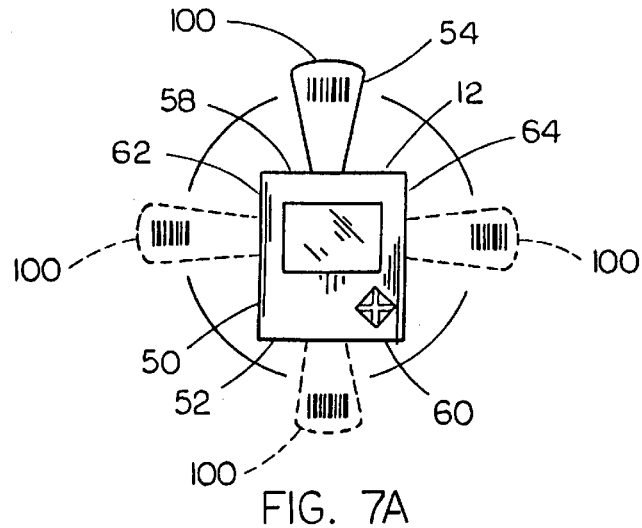
FIGS. 7A and 7B depict a hand-held portable data collection system of the present invention wherein the data file reader utilizes an adjustable, non-orthogonal reading field of view.
Figure 7B:
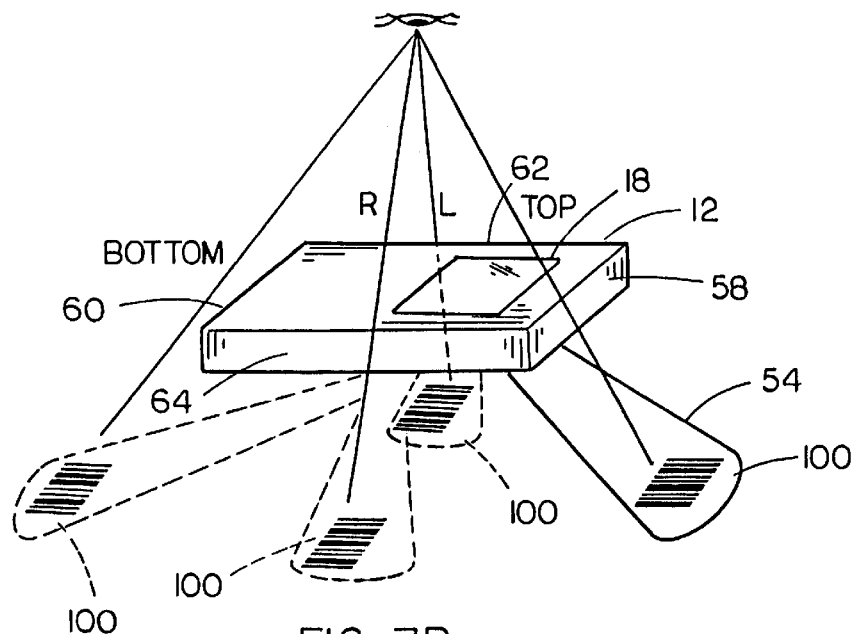

As depicted in FIGS. 7A and 7B, the hand-held data terminal 12 may be designed to include an integrated data file reader 22 wherein the housing of the data terminal typically has a lengthwise run 50 and a widthwise run 52 (e.g., generally somewhat rectangularly shaped; data terminals having other shapes are also contemplated). The data file reader 22 has a reading field of view 54 that extends from the housing of the data terminal 12 that permits the operator to conveniently position the terminal to place optically readable indicia 100 within the reading field of view without sighting along the lengthwise 50 or widthwise run 52 of the housing. With typical gun shaped data file readers, as shown in FIG. 8, generally having a barrel shaped housing with a pistol grip, the operator 16 must sight along the barrel, or lengthwise run 50, of the housing to position the indicia 100 within the reading field of view 54 of the reader by holding the housing near eye level.

Figure 9:
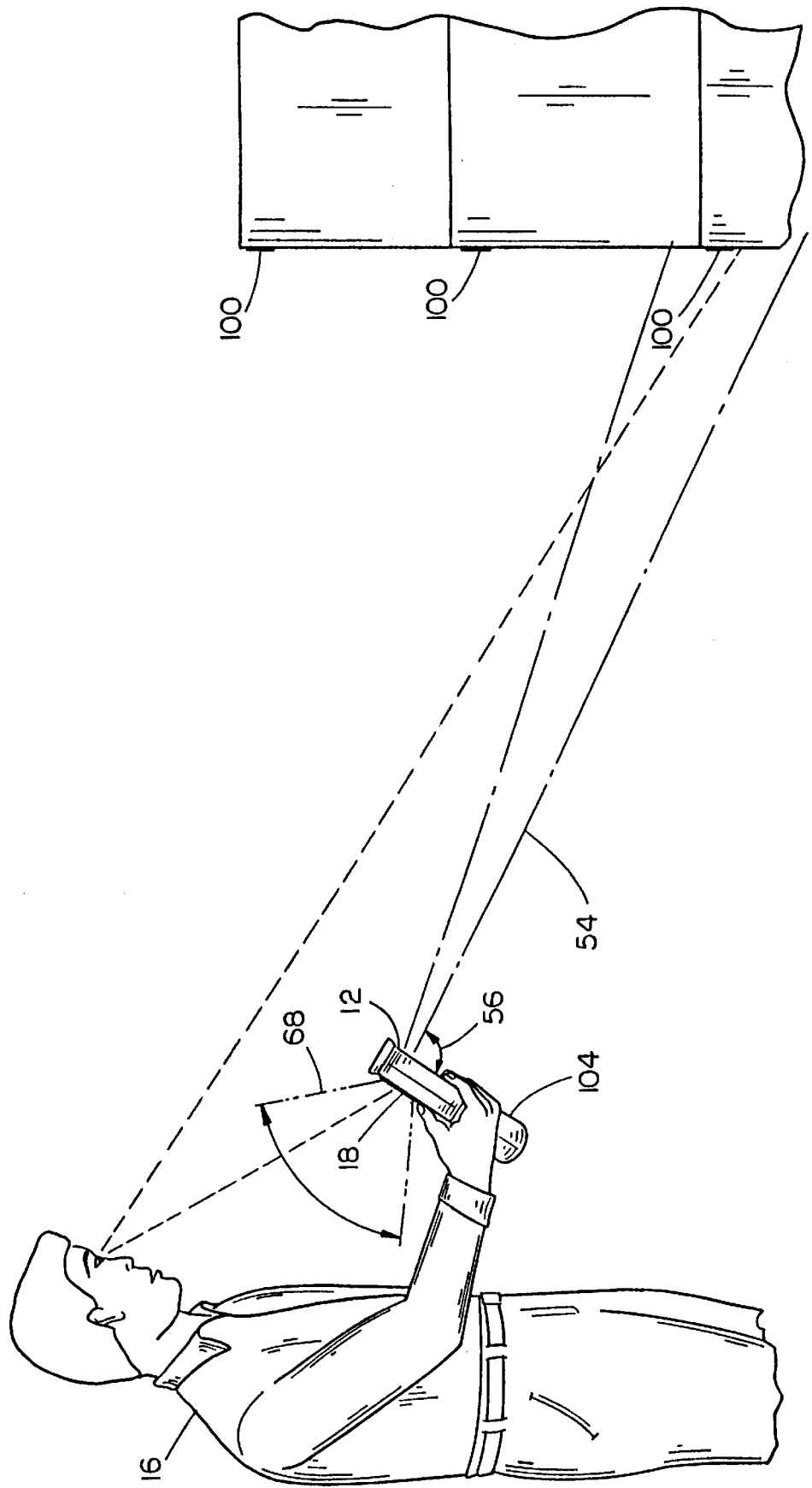
FIG. 9 illustrates an operator utilizing a data terminal of the present invention near hip level.

The reading field of view 54 of the present invention may be directed downward from a top end or undersurface of the housing such that the terminal may be held at a non-eye level position such as near-hip level (see FIG. 9). The terminal 12 is shaped to be comfortably held in one hand during hand-held operation, and is not required to be gun shaped. Thus, the design of the terminal need not be dictated by the data file reader; rather the data file reader may be integrated within an ideally designed data terminal housing that is comfortably held in one hand at hip level rather than near eye level.

Figure 10A:
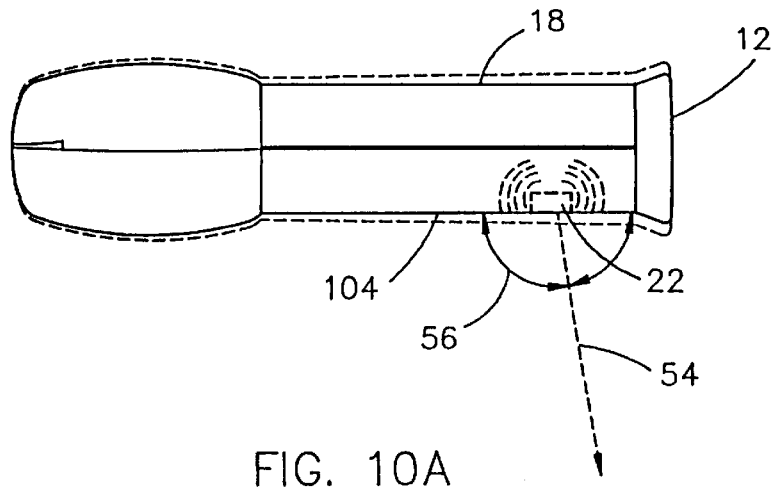
FIGS. 10A, 10B and 10C illustrates various data terminals wherein the data file reader utilizes various reading fields of view, and further illustrating the relationships of the data file reader and the vibrational element of the somatic communications system.
Figure 10B:
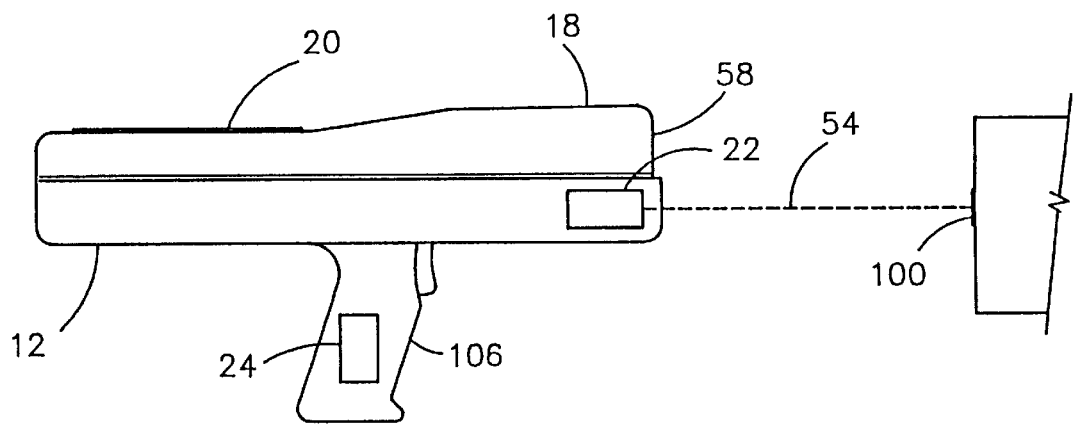
Figure 10C:
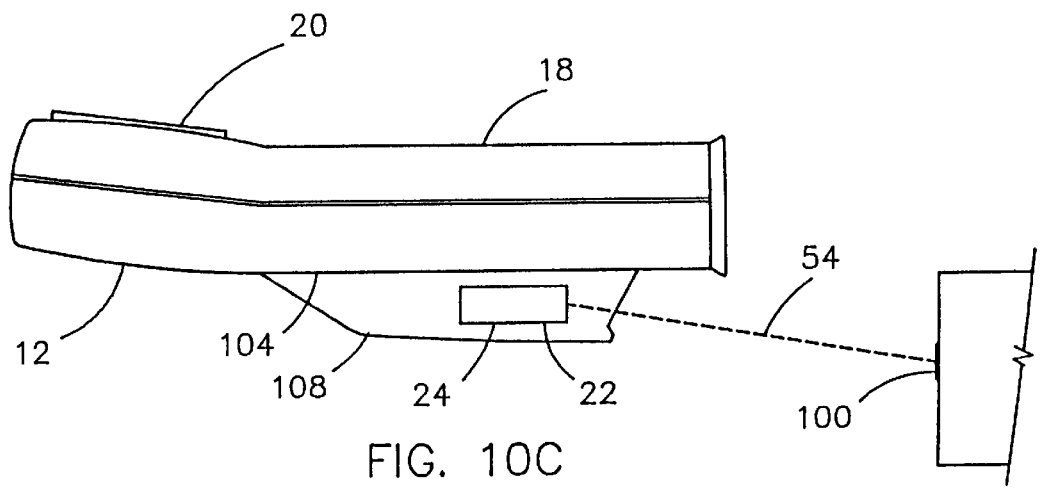

As depicted in FIG. 10A the reading field of view 54 of the data file reader may be disposed at an angle 56 which is non-orthogonal, or non-perpendicular, with respect to the housing of the data terminal 12. In FIG. 10B a terminal 12 is shown having a pistol grip extension 106 wherein the vibrational element 24 is disposed in the pistol grip extension and the data file reader 22 is disposed at the top end 58 of the terminal. FIG. 10C depicts a further type of data terminal design wherein the vibrational element 24 and the data file reader 22 are disposed in an external pod 108 disposed on the underside of the data terminal.

Prior data file readers typically have the reading field of view 54, generally cone shaped, extend from the housing wherein the central axis 54 of the cone shaped reading field of view is orthogonal, or perpendicular, with respect to a planar surface of the data terminal or reader, e.g., directly forward, directly to the left or directly to the right. Orthogonal, generally perpendicular, reading field of views generally are non-ideal in that the display 12 of the terminal 12 may not be optimally positioned for viewing during indicia reading operations, thereby preventing the display from being viewed for assisting in the data collection process while a reading is being performed (see FIG. 8 for example). The nonorthogonal, non-perpendicular, disposition of the reading field of view with respect to the housing of the present invention allows the display to be optimally positioned for viewing during the data collection process such as reading optically readable indicia 100 wherein the information on the display may be utilized to assist the operator during the data collection process. In such a position, the display is viewable concomitantly with the viewing of optically readable indicia 100 as illustrated by example in FIG. 9.

In FIGS. 7A and 7B the housing of the hand-held portable data collection terminal is generally rectangularly shaped in that the housing includes a top edge 58, a bottom edge 60, a left edge 62 and a right edge 64. The reading field of view 54 of the data file reader 22 extends non-orthogonally, non-perpendicularly, from the terminal 12 in that the central axis of the reading field of view is not disposed orthogonally, or perpendicularly, with respect to at least one of the edges or surfaces of the housing. For example, the reading field of view 54 of the data file reader may extend frontwardly from the top edge of the housing, thereby allowing optically readable indicia 100 to be viewed over the top edge 58 of the terminal when the indicia 100 are disposed within the reading field of view 54.

Similarly, the reading field of view 54 may extend non-orthogonally, non-perpendicularly, from the terminal 12 in other directions such that optically readable indicia 100 may be viewed over the bottom edge 60 of the terminal 12 or around the left edge 62 or the right edge 64, respectively, when indicia 100 are disposed within the reading field of view 54. The operator 16 may adjust the angle at which the reading field of view 54 extends from the terminal to suit his own preferences or needs, e.g., a right handed operator may desire to hold the terminal in his right hand and extend the reading field of view to the left for viewing around the left edge of the terminal while a left handed operator may desire to hold the terminal in his left hand and extend the reading field of view to the right for viewing around the right edge of the terminal. This may be accomplished by programming of the data collection system 10 at the beginning of a utilization shift, for example. The operator may manually adjust the reading field of view with keypad or touch screen input by selecting from a group of preset detente positions (e.g., left, right, up, down, etc.). The reading field of view may also be adjusted by positioning the reader near a reference indicia 100 such that the data terminal is held in a preferred position with respect to the indicia. A program may then be run by the data terminal which sweeps the reading field of view until the indicia is located. The reading field of view will then be locked in that position for data collection until later changed (e.g., for another operator).

The operator 16 may enter his handedness into the data collection terminal 12 which may automatically adjust the field of view accordingly. Alternatively, the direction of extension of the reading field of view 54 from the terminal 12 may be calibrated by the operator by using a reference indicia 100. The operator 16 may hold the data terminal in the desired location with respect to the reference indicia 100. The reading field of view may be adjusted, automatically by the operating system via a convergence algorithm, or manually by keypad input adjustment or display input adjustment using virtual keys 66, as illustrated in FIG. 11, until the indicia 100 is disposed in the reading field of as indicated upon the ability of the data file reader 22 to read the entire indicia 100.

As illustrated in FIG. 9, the display 18 of the hand-held portable data terminal 12 provides a viewing angle 68 generally defining a cone-shaped volume in which information displayed on the display 18 is optimally viewable by the operator 16. As shown in FIG. 8, viewing the display 18 at an angle outside of the viewing angle 68 is less than optimum, rendering the information displayed thereon difficult or impossible to read due to the extreme viewing angle. The optimal viewing angle 68 may be defined by the display technology, i.e. a passive super twisted nematic LCD type display may have a more limited viewing angle than an active matrix LCD type display.

Figure 11:
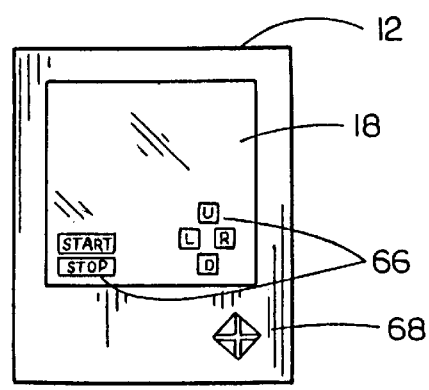
FIG. 11 illustrates a data terminal of the present invention having virtual keys integrated with a touch screen input display.

As illustrated in FIGS. 10 and 11, the reading field of view 54 of the data file reader 22 extends outwardly from the data terminal 12 at a non-orthogonal, non-perpendicular, angle 56 allowing the display 18 to be viewed within the optimal viewing angle thereof. Optically readable indicia 100 appearing within the reading field of view 54 and the display 18 are then viewable simultaneously such that the display is viewed at the optimal viewing angle. This arrangement allows the display 18 to be viewed by the operator during data collection functions without requiring the operator to divert his attention away from the indicia 100 or reposition the reader 12 to view the display. The operator need not sight along a line parallel to the surface of the housing, such as the upper surface, to accomplish simultaneous viewing of the indicia 100 and the display.

U.S. Pat. No. 5,414,251 issued May 9, 1995 to Dennis A. Durbin describes a reader for decoding two-dimensional optical information which uses a real-time display of optical images to assist in decoding optical information. Such a system may be utilized in the present invention as described herein in combination therewith as an integral portion of the data collection system. Said Pat. No. 5,414,251 is hereby incorporated herein by reference in its entirety.

Simultaneous viewing of the display 18 and the indicia 100 allows the display 18 to be functional during the data collection process. The data collection terminal is designed to be comfortably operable in one hand while maintaining maximum functionality. As shown in FIG. 9, the data terminal may be operated near the hip level of the operator 16 during simultaneous viewing of the display and indicia 100, further contributing to the comfort of the operator during the data collection process.

Additionally, the angle 56 at which the reading field of view of the hand-held portable data terminal 12 is disposed with respect to the terminal housing is adjustable by the operator to a preferred position at which the operator may comfortably hold and operate the data terminal in one hand, simultaneously view the display and optically readable indicia 100, and sight the indicia 100 and adjust the reading field of view to dispose the indicia 100 therein. As depicted in FIGS. 7A, 7B and FIG. 11, the angle of disposition 56 of the reading field of view 54 may be further adjusted by a tactile input to the terminal 12 such as with a directional key 68, mouse or track ball type key on the data terminal 12 or via a virtual directional key 66, mouse or track ball type icon on the tactile input display.

The display 18 is operable to receive tactile data input during the data collection process. The tactile data input may be received simultaneously with the operation of the data file reader and may be an integral part of the data collection system. The tactile input may be received as an analog signal or may be digitized into a binary signal. The data received by the display may include data for operational control of the display 18 such as through a virtual trigger 66 on the display.

The display 18 is further operable to display information to the operator 16 concerning the operation of the data file reader 22. For example, the data file reader 22 may be an optical reader and the display may display an icon indicating that the reader is reading indicia 100. The display may display a second icon which indicates the successful reading of the indicia 100. Other information may be displayed as well (e.g., initiation or termination of reading, unsuccessful or successive reading, etc.). Other various types of indicia 100 readers may be similarly operable, e.g., a laser scanner, etc.

The information decoded from the optically readable indicia 100 may be displayed for verification by the operator 16. The image of the optically readable indicia 100 itself may be displayed on the terminal which may be viewable by the operator, for example as illustrated in FIGS. 1, 2 and 3 of the incorporated Durbin U.S. Pat. No. 5,414,251. The displaying of the image on the display may assist the operator 16 in positioning the data terminal 12 to dispose the indicia 100 within the reading field of view 54. For example, only a partial image of the indicia 100 may appear on the display 18, as shown in FIG. 1 of the Durbin patent, indicating the need to adjust the reading field of view 54 or the terminal 12. The position of the indicia 100 on the display 18 indicates the direction which the terminal 12 must be moved in order to fully image the indicia 100 such that the indicia 100 is readably disposed within the reading field of view 54 of the data file reader 22.

Alternatively, the reading field of view 54 may be adjusted to fully readably dispose indicia 100 within the reading field of view 54 of the data file reader 22. The adjustment of the reading field of view 54 may be accomplished via key pad input 68 or tactile input into the display 66, which may be proportional to the coordinate position of the data input on the display 18 (see FIGS. 7A, 7B and FIG. 11). The reading field of view 54 may be dynamically adjusted during the indicia 100 reading process until a successful positioning is achieved. The tactile input may be digitized for digital processing of the input data received by the display 18. The data collection system 10 may be programmed to initiate the indicia 100 reading process upon the reading field of view 54 impinging upon and being fully coincident with the indicia 100.

The somatic communications system 14 may be operable in conjunction with the operation of the data file reader 22 such that the indicia 100 is simultaneously viewable with the display to further enhance the functionality of the hand-held portable data collection system of the present invention. The display 18 and the indicia 100 are simultaneously viewable while the indicia 100 is disposed within the reading field of view 54 of the data file reader 22 without sighting along a line substantially parallel, or nearly so, to the upper surface of the terminal 12. For example the terminal 12 of FIG. 10A illustrates a data file reader 22 having a reading field of view 54 extending at a non-orthogonal angle 56 from the terminal 12. The terminals 12 illustrated in FIGS. 4 and 10 are shown to be vibrating due to the operation of the somatic communications system 14. Such operation of the somatic communications system 14 may be utilized in conjunction with the method of operation as shown in FIG. 9.

Figure 12:
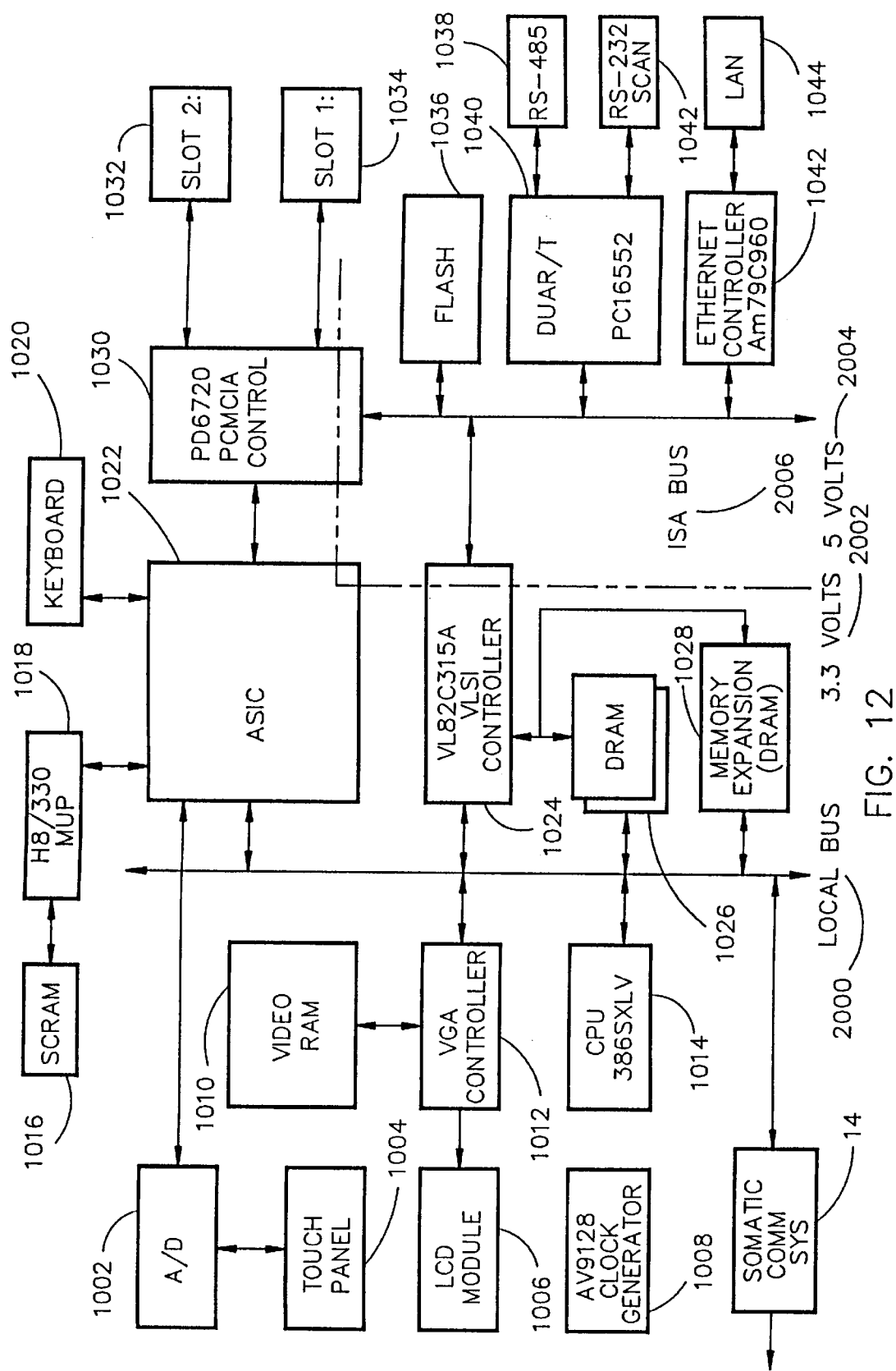
FIG. 12 is a diagrammatic representation of the architecture of a hand-held portable data collection terminal which utilizes the somatic communications system of the present invention.
Figure 13:
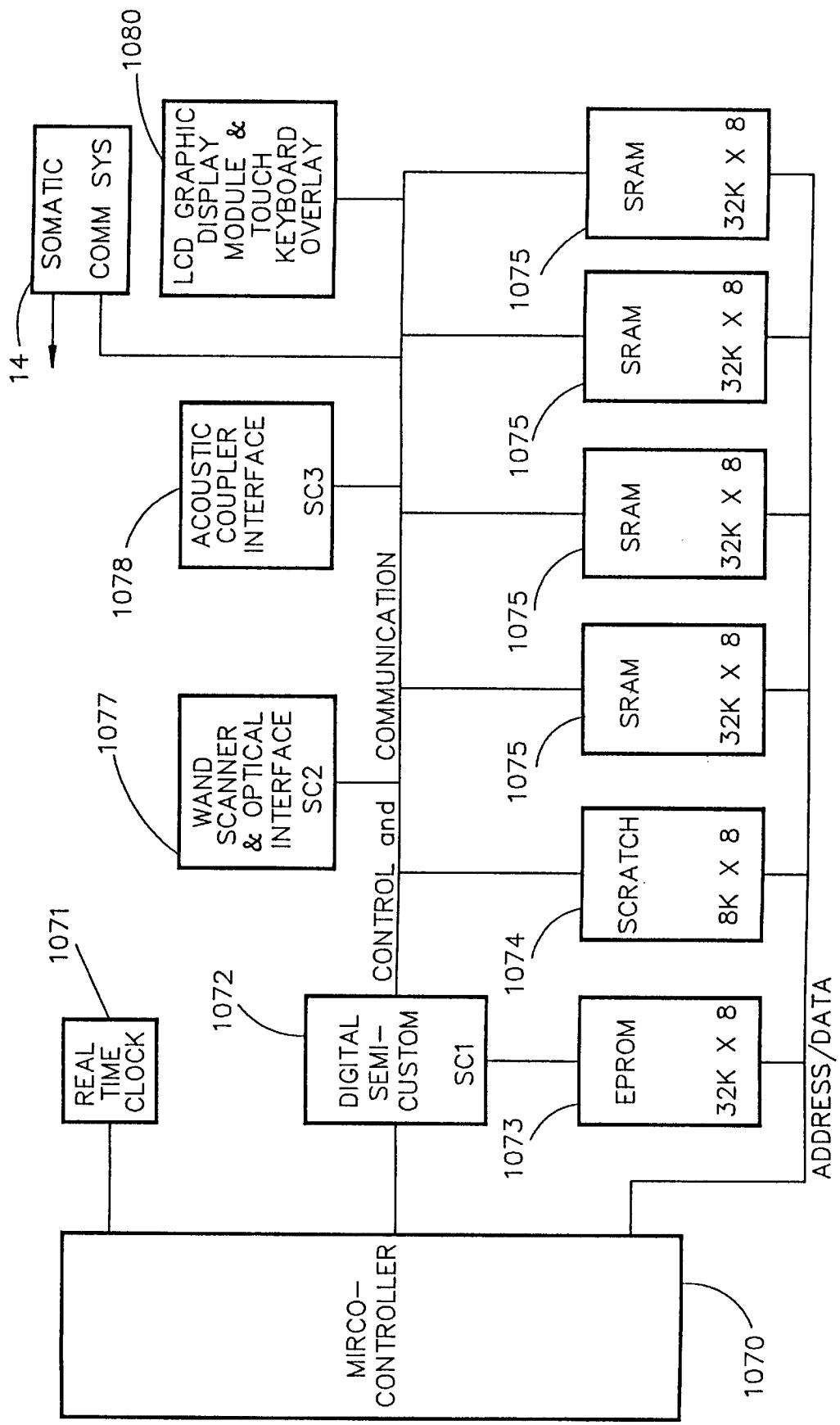
FIG. 13 is a diagrammatic representation of the architecture of another hand-held portable data collection terminal which utilizes the somatic communications system of the present invention.
Figure 14:
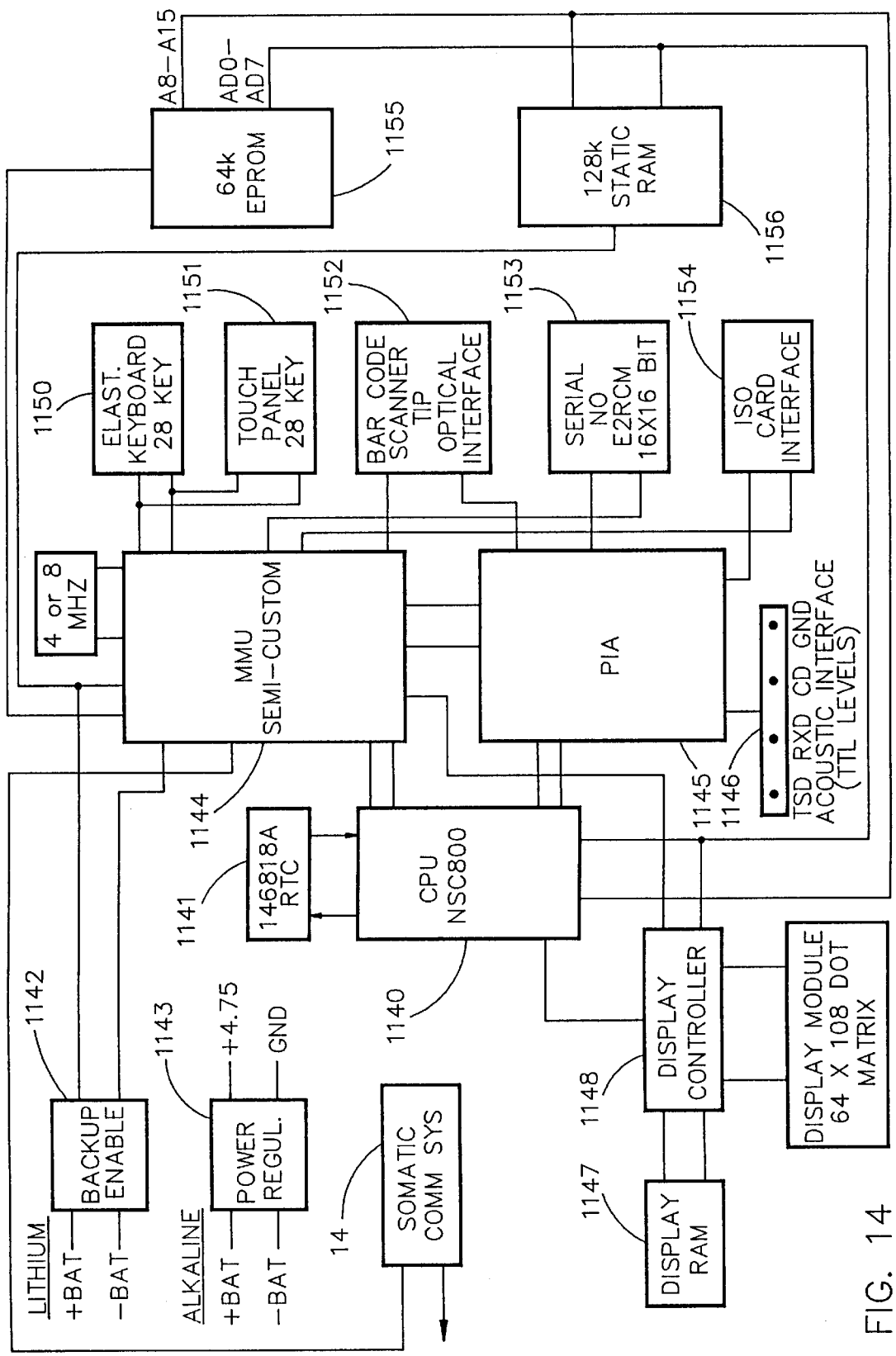
FIG. 14 is a diagrammatic representation of the architecture of a further hand-held portable data collection terminal which utilizes the somatic communications system of the present invention.

FIGS. 12, 13 and 14 depict schematic diagrams of the architecture of portable hand-held data collection terminals having the somatic communications system 14 of the present integrated therewith. In FIG. 12 the somatic communications system 14 may interface with the data terminal system via a local bus 2000. The somatic communications system 14 is thereby able to receive commands from a central processing unit 1014 as needed for operation. FIG. 13 illustrates the somatic communications system 14 capable of receiving control commands from a microcontroller 1070 via a communications bus (CONTROL AND COMMUNICATION). FIG. 14 illustrates the somatic communications system 14 of the present invention capable of receiving control commands from a central processing unit 1140 through a custom or semi custom integrated circuit interface 1144.

In view of the above detailed description, various other modifications will now become apparent to those skilled in the art.

What is claimed is:

1. A hand-held portable data collection system for reading data comprising:

(a) a hand-held portable data collection terminal for collecting data; and (b) a somatic communications system operatively integrated with said hand-held portable data collection terminal for tactually communicating with an operator by producing a vibrational signal during hand-held utilization thereof;

wherein said somatic communications system produces an output to the operator responsive to movement of said hand-held portable data terminal.

2. The hand-held portable data collection system of claim 1 wherein said hand-held portable data collection terminal has at least one central axis therethrough corresponding to a center of mass thereof, said somatic communications system being disposed off of said at least one central axis such that the vibrational signal of said somatic communications system is thereby augmented.

3. The hand-held portable data collection system of claim 1 wherein said somatic communications system includes a data file reader such that operation of said data file reader contributes to the vibrational signal of said somatic communications system.

4. The hand-held portable data collection system of claim 3 wherein said data file reader is a laser scanner.

5. The hand-held portable data collection system of claim 3 wherein said data file reader is a direct illumination laser scanner wherein optically readable indicia is illuminated with a laser without any reflective surfaces interposed in the laser beam path.

6. The hand-held portable data collection system of claim 3 wherein said data file reader is a retro-reflective scanner.

7. The hand-held portable data collection system of claim 3 wherein data file reader includes a photosensitive array.

8. The hand-held portable data collection system of claim 7 wherein the photosensitive array is a charge-coupled device.

9. The hand-held portable data collection system of claim 1 wherein said somatic communications system produces an output to the operator responsive to an input stimulus received by said hand-held portable data terminal.

10. The hand-held portable data collection system of claim 3 wherein said somatic communications system produces an output to the operator responsive to data input received from optically readable indicia read by said data file reader.

11. The hand-held portable data collection system of claim 1 wherein said somatic communications system produces an output to the operator responsive to movement of said hand-held portable data terminal, said movement being characteristic of pre-data collecting operation thereof.

12. The hand-held portable data collection system of claim 1 wherein said somatic communications system produces an output to the operator responsive to movement of said hand-held portable data terminal, said movement being characteristic of data collection operation thereof.

13. The hand-held portable data collection system of claim 1 wherein said somatic communications system produces an output to the operator responsive to movement of said hand-held portable data terminal, said movement being characteristic of post data collection operation thereof.

14. The hand-held portable data collection system of claim 1 wherein said somatic communications system includes a vibrational control system for operatively controlling the vibrational signal thereof.

15. The hand-held portable data collection system of claim 1 wherein said somatic communications system operatively controls the vibrational signal thereof in response to an input stimulus received by said hand-held portable data terminal.

16. The hand-held portable data collection system of claim 1 wherein said somatic communications system operatively controls the vibrational signal thereof in response to data input received from optically readable indicia read by said data file reader.

17. A hand-held portable date collection system for reading data comprising:
(a) a hand-held portable data collection terminal for collecting data; and
(b) a somatic communications system operatively integrated with said hand-held portable date collection terminal for tactually communicating with an operator by producing a vibrational signal during hand-held utilization thereof;
wherein said somatic communications system operatively controls the vibrational signal thereof in response to movement of said hand-held portable data terminal.

18. The hand-held portable data collection system of claim 17 wherein said somatic communications system operatively controls the vibrational signal thereof in response to movement of said hand-held portable data terminal, said movement being characteristic of pre-data collection operation thereof.

19. The hand-held portable data collection system of claim 17 wherein said somatic communications system operatively controls the vibrational signal thereof in response to movement of said hand-held portable data terminal, said movement being characteristic of data collection operation thereof.

20. The hand-held portable data collection system of claim 17 wherein said somatic communications system operatively controls the vibrational signal thereof in response to movement of said hand-held portable data terminal, said movement being characteristic of post data collection operation thereof.

21. The hand-held portable data collection system of claim 14 wherein said vibrational controlling system is operatively capable of augmenting the vibrational signal of said somatic communications system.

22. The hand-held portable data collection system of claim 14 wherein said vibrational control system is operatively capable dampening the vibrational signal of said somatic communications system.

23. The hand-held portable data collection system of claim 1 wherein said somatic communications system is operatively utilized to assist the operator in reading optically readable indicia.

24. A hand-held portable data collection system for reading data comprising:
(a) a hand-held portable data collection terminal for collecting data; and
(b) a somatic communications system operatively integrated with said hand-held portable data collection terminal for tactually communicating with an operator by producing a vibrational signal during hand-held utilization thereof;
wherein said data file reader includes a reading field of view in which optically readable indicia may be read, said somatic communications system being operatively utilized to assist the operator in positioning said hand-held portable data terminal such that optically readable indicia appear in the reading field of view thereof.

25. The hand-held portable data collection system of claim wherein said data file reader includes a reading field of view in which optically readable indicia may be read, said somatic communications system being operatively utilized to indicate to the operator a positioning of said hand-held portable data terminal such that optically readable indicia appear in the reading field of view thereof.

26. The hand-held portable data collection system of claim 24 wherein said data file reader includes a reading field of view in which optically readable indicia may be read, said somatic communications system being operatively utilized to indicate to the operator initiation of reading of optically readable indicia appearing in the reading field of view thereof.

27. The hand-held portable data collection system of claim 24, wherein said data file reader includes a reading field of view in which optically readable indicia may be read, said somatic communications system being operatively utilized to indicate to the operator a successful reading of optically readable indicia appearing in the reading field of view thereof.

28. The hand-held portable data collection system of claim 24 wherein said data file reader includes a reading field of view in which optically readable indicia may be read, said somatic communications system being operatively utilized to indicate to the operator an unsuccessful reading of optically readable indicia appearing in the reading field of view thereof.

29. The hand-held portable data collection system of claim 24 wherein said data file reader includes a reading field of view in which optically readable indicia may be read, said somatic communications system being operatively utilized to indicate to the operator successive reading of optically readable indicia appearing in the reading field of view thereof.

30. The hand-held portable data collection system of claim 24 wherein said data file reader includes a reading field of view in which optically readable indicia may be read, said somatic communications system being operatively utilized to indicate to the operator termination of reading of optically readable indicia appearing in the reading field of view thereof.

31. A hand-held portable data collection system for reading data in the form of optically readable indicia during utilization thereof in the hand of an operator, said hand-held portable data collection system comprising:
(a) a hand-held portable data collection terminal for collecting, processing and transferring data, said hand-held portable data terminal having a housing; and (b) a data file reader operatively integrated with said hand-held portable data collection system for reading data encoded as optically readable indicia, said data file reader having a reading field of view in which optically readable indicia may be read, (c) said reading field of view of said data file reader extending from the housing in a direction permitting an operator to conveniently position said hand-held portable data terminal such that optically readable indicia are disposed in the reading field of view when held near hip level.

32. The hand-held portable data collection system of claim 31 wherein said hand-held portable data collection terminal is shaped to be comfortably held in one hand during hand-held operation thereof.

33. The hand-held portable data collection system of claim 31, further comprising a display disposed on the upper surface of said hand-held portable data terminal, said display having an optimal viewing angle within which information displayed thereon is readily viewable by the operator.

34. The hand-held portable data collection system of claim 31 wherein the reading field of view of the data file reader is disposed at a non-orthogonal, non-perpendicular, angle with respect to the housing of the hand-held portable data collection terminal.

35. The hand-held portable data collection terminal system of claim 31 wherein the housing of said hand-held portable data collection terminal is generally rectangularly shaped having a top edge, a bottom edge, a left edge and a right edge, the reading field of view of said data file reader being sufficiently disposed relative to the housing to permit the operator to conveniently position the reader such that optically readable indicia are disposed in the reading field of view by directing the reading field of view toward the optically readable indicia wherein the optically readable indicia is viewable by the operator by viewing over the top edge of the housing.

36. The hand-held portable data collection terminal system of claim 31 wherein the housing of said hand-held portable data collection terminal is generally rectangularly shaped having a top edge, a bottom edge, a left edge and a right edge, the reading field of view of said data file reader being sufficiently disposed relative to the housing to permit the operator to conveniently position the reader such that optically readable indicia are disposed in the reading field of view by directing the reading field of view toward the optically readable indicia wherein the optically readable indicia is viewable by the operator by viewing under the bottom edge of the housing.

37. The hand-held portable data collection terminal system of claim 31 wherein the housing of said hand-held portable data collection terminal is generally rectangularly shaped having a top edge, a bottom edge, a left edge and a right edge, the reading field of view of said data file reader being sufficiently disposed relative to the housing to permit the operator to conveniently position the reader such that optically readable indicia are disposed in the reading field of view by directing the reading field of view toward the optically readable indicia wherein the optically readable indicia is viewable by the operator by viewing around the left edge of the housing.

38. The hand-held portable data collection terminal system of claim 31 wherein the housing of said hand-held portable data collection terminal is generally rectangularly shaped having a top edge, a bottom edge, a left edge and a right edge, the reading field of view of said data file reader being sufficiently disposed relative to the housing to permit the operator to conveniently position the reader such that optically readable indicia are disposed in the reading field of view by directing the reading field of view toward the optically readable indicia wherein the optically readable indicia is viewable by the operator by viewing around the right edge of the housing.

39. The hand-held portable data collection system of claim 31 wherein the housing of said hand-held portable data collection terminal is generally rectangularly shaped having a top edge, a bottom edge, a left edge and a right edge wherein the reading field of view of the reader is disposed at an angle adjustable by the operator to a preferred position with respect to the housing.

40. The hand-held portable data collection system of claim 31 wherein said data file reader is a laser scanner.

41. The hand-held portable data collection system of claim 31 wherein said data file reader is a direct illumination laser scanner wherein optically readable indicia is illuminated with a laser without any reflective surfaces interposed in the laser beam path.

42. The hand-held portable data collection system of claim 31 wherein said data file reader is a retro-reflective scanner.

43. The hand-held portable data collection system of claim 31 wherein said data file reader includes a photosensitive array.

44. The hand-held portable data collection system of claim 43 wherein the photosensitive array is a charge-coupled device.

45. A hand-held portable data collection system for reading data in the form of optically readable indicia during utilization thereof in the hand of an operator, said hand-held portable data collection system comprising:

(a) a hand-held portable data collection terminal for collecting, processing and transferring data, said hand-held portable data terminal having generally a housing and an upper housing surface;

(b) a data file reader operatively integrated with said hand-held portable data collection system for reading data encoded as optically readable indicia, said data file reader including a reading field of view in which optically readable indicia may be read; and (c) a display disposed on the upper surface of said hand-held portable data terminal, said display having an optimal viewing angle within which information displayed thereon is readily viewable by an operator, wherein said display is capable of digitizing tactile data input simultaneous with operation of said data file reader.

46. The hand-held portable data collection system of claim 45 wherein said hand-held portable data collection terminal is shaped to be comfortably held in one hand during hand-held operation thereof.

47. The hand-held portable data collection system of claim 46 wherein said hand-held portable data collection terminal is further shaped to be comfortably operable near hip level.

48. The hand-held portable data collection system of claim 45 wherein the reading field of view of the data file reader is disposed at a non-orthogonal, non-perpendicular, angle with respect to the housing of the hand-held portable data collection terminal.

49. The hand-held portable data collection terminal system of claim 45 wherein the housing of said hand-held portable data collection terminal is generally rectangularly shaped having a top edge, a bottom edge, a left edge and a right edge, the reading field of view of said data file reader being sufficiently disposed relative to the housing to permit the operator to conveniently position the reader such that optically readable indicia are disposed in the reading field of view by directing the reading field of view toward the optically readable indicia wherein the optically readable indicia is viewable by the operator by viewing over the top edge of the housing.

50. The hand-held portable data collection terminal system of claim 45 wherein the housing of said hand-held portable data collection terminal is generally rectangularly shaped having a top edge, a bottom edge, a left edge and a right edge, the reading field of view of said data file reader being sufficiently disposed relative to the housing to permit the operator to conveniently position the reader such that optically readable indicia are disposed in the reading field of view by directing the reading field of view toward the optically readable indicia wherein the optically readable indicia is viewable by the operator by viewing under the bottom edge of the housing.

51. The hand-held portable data collection terminal system of claim 45 wherein the housing of said hand-held portable data collection terminal is generally rectangularly shaped having a top edge, a bottom edge, a left edge and a right edge, the reading field of view of said data file reader being sufficiently disposed relative to the housing to permit the operator to conveniently position the reader such that optically readable indicia are disposed in the reading field of view by directing the reading field of view toward the optically readable indicia wherein the optically readable indicia is viewable by the operator by viewing around the left edge of the housing.

52. The hand-held portable data collection terminal system of claim 45 wherein the housing of said hand-held portable data collection terminal is generally rectangularly shaped having a top edge, a bottom edge, a left edge and a right edge, the reading field of view of said data file reader being sufficiently disposed relative to the housing to permit the operator to conveniently position the reader such that optically readable indicia are disposed in the reading field of view by directing the reading field of view toward the optically readable indicia wherein the optically readable indicia is viewable by the operator by viewing around the right edge of the housing.

53. The hand-held portable data collection system of claim 45 wherein the housing of said hand-held portable data collection terminal is generally rectangularly shaped having a top edge, a bottom edge, a left edge and a right edge wherein the reading field of view of the reader is disposed at an angle adjustable by the operator to a preferred position with respect to the housing.

54. The hand-held portable data collection system of claim 45 wherein the data file reader is a laser scanner.

55. The hand-held portable data collection system of claim 45 wherein the data file reader is a direct illumination laser scanner wherein optically readable indicia is illuminated with a laser without any reflective surfaces interposed in the laser beam path.

56. The hand-held portable data collection system of claim 45 wherein the data file reader is a retro-reflective scanner.

57. The hand-held portable data collection system of claim 45 wherein the data file reader includes a photosensitive array.

58. The hand-held portable data collection system of claim 57 wherein the photosensitive array is a charge-coupled device.

59. The hand-held portable data collection system of claim 45 wherein said display is capable of receiving tactile data input.

60. The hand-held portable data collection system of claim 45 wherein said display is capable of digitizing tactile data input.

61. The hand-held portable data collection system of claim 45 wherein said display is capable of receiving tactile data input simultaneous with operation of said data file reader.

62. The hand-held portable data collection system of claim 45 wherein said display is capable of receiving tactile data input simultaneous with operation of said data file reader such that said tactile data input includes data for operational control of said data file reader.

63. The hand-held portable data collection system of claim 45 wherein said display is capable of digitizing tactile data input simultaneous with the operation of said data file reader such that said tactile data input includes data for operational control of said data file reader.

64. A hand-held portable data collection system for reading data in the form of optically readable indicia during utilization thereof in the hand of an operator, said hand-held portable data collection system comprising:
(a) a hand-held portable data collection terminal for collecting, processing and transferring data, said hand-held portable data terminal having generally a housing and an upper housing surface;
(b) a data file reader operatively integrated with said hand-held portable data collection system for reading data encoded as optically readable indicia, said data file reader including a reading field of view in which optically readable indicia may be read;
(c) a display disposed on the upper surface of said hand-held portable data terminal, said display having an optimal viewing angle within which information displayed thereon is readily viewable by the operator; and
(d) the reading field of view of said data file reader being sufficiently disposed relative the optimal viewing angle of said display to permit the operator to conveniently position the reader such that optically readable indicia are disposed in the reading field of view by directing the reading field of view toward the optically readable indicia without sighting along a line substantially parallel to the upper surface of the housing and such that said display is viewable by the operator within the optimal viewing angle wherein said display displays information concerning the operation of said data file reader.

65. The hand-held portable data collection system of claim 64 wherein said display displays information disposed within the reading field of view of said data file reader.

66. The hand-held portable data collection system of claim 64 wherein said display displays an image of optically readable indicia disposed within the reading field of view of said data file reader.

67. The hand-held portable data collection system of claim 64 wherein said display displays information to assist the operator in operating said data file reader.

68. The hand-held portable data collection system of claim 64 wherein said display displays information to assist the operator in positioning said hand-held portable data collection terminal during operation of said data file reader.

69. The hand-held portable data collection system of claim 64 wherein said display displays information to assist the operator in positioning said hand-held portable data collection terminal such that optically readable indicia are readably disposed within the reading field of view of said data file reader.

70. The hand-held portable data collection system of claim 64 wherein said display displays information indicating initiation of reading optically readable indicia.

71. The hand-held portable data collection system of claim 64 wherein said display displays information indicating a successful reading of optically readable indicia.

72. The hand-held portable data collection system of claim 64 wherein said display displays information indicating an unsuccessful reading of optically readable indicia.

73. The hand-held portable data collection system of claim 64 wherein said display displays information indicating successive reading of optically readable indicia.

74. The hand-held portable data collection system of claim 64 wherein said display displays information indicating termination of reading optically readable indicia.

75. The hand-held portable data collection system of claim 64 wherein said display displays information indicating said data file reader is incapable of reading optically readable indicia disposed within the reading field of view of said data file reader.

76. A hand-held portable data collection system for reading data in the form of optically readable indicia during utilization thereof in the hand of an operator, said hand-held portable data collection system comprising:

(a) a hand-held portable data collection terminal for collecting, processing and transferring data, said hand-held portable data terminal having generally a housing and an upper housing surface;

(b) a data file reader operatively integrated with said hand-held portable data collection system for reading data encoded as optically readable indicia, said data file reader including a reading field of view in which optically readable indicia may be read;

(c) a display disposed on the upper surface of said hand-held portable data terminal, said display having an optimal viewing angle within which information displayed thereon is readily viewable by the operator; and (d) the reading field of view of said data file reader being sufficiently disposed relative the optimal viewing angle of said display to permit the operator to conveniently position the reader such that optically readable indicia are disposed in the reading field of view by directing the reading field of view toward the optically readable indicia without sighting along a line substantially parallel to the upper surface of the housing and such that said display is viewable by the operator within the optimal viewing angle, wherein said display is capable of receiving tactile data input simultaneous with operation of said data file reader such that said tactile data input includes data for initiating reading of optically readable indicia disposed within the reading field of view of said data file reader.

77. The hand-held portable data collection system of claim 76 wherein said display is capable of digitizing tactile data input simultaneous with the operation of said data file reader such that said tactile data input includes data for initiating reading of optically readable indicia disposed within the reading field of view of said data file reader.

78. The hand-held portable data collection system of claim 76 wherein said display is capable of receiving tactile data input such that said tactile data input includes data for adjusting disposition of the reading field of view with respect to the housing of said hand-held portable data terminal.

79. The hand-held portable data collection system of claim 76 wherein said display is capable of digitizing tactile data input such that said tactile data input includes data for adjustably disposing the reading field of view with respect to the housing of said hand-held portable data terminal.

80. The hand-held portable data collection system of claim 76 wherein said display is capable of receiving tactile data input simultaneous with operation of said data file reader such that said tactile data input includes data for adjustably disposing the reading field of view with respect to the housing of said hand-held portable data terminal proportional to the coordinate position of said tactile data input on said display.

81. The hand-held portable data collection system of claim 76 wherein said display is capable of digitizing tactile data input simultaneous with operation of said data file reader such that said tactile data input includes data for adjusting disposition of the reading field of view with respect to the housing of said hand-held portable data terminal proportional to the coordinate position of said tactile data input on said display.

82. The hand-held portable data collection system of claim 76 wherein said display is capable of receiving tactile data input simultaneous with operation of said data file reader such that said tactile data input includes data for adjustably disposing the reading field of view with respect to the housing of said hand-held portable data terminal proportional to the coordinate position of said tactile data input on said display wherein the reading field of view of said data file reader is dynamically positioned to impinge upon optically readable indicia.

83. The hand-held portable data collection system of claim 76 wherein said display is capable of digitizing tactile data input simultaneous with operation of said data file reader such that said tactile data input includes data for adjusting disposition of the reading field of view with respect to the housing of said hand-held portable data terminal proportional to the coordinate position of said tactile data input on said display wherein the reading field of view of said data file reader is dynamically positioned to impinge upon optically readable indicia.

84. The hand-held portable data collection system of claim 76 wherein said display is capable of receiving tactile data input simultaneous with operation of said data file reader such that said tactile data input includes data for adjustably disposing the reading field of view with respect to the housing of said hand-held portable data terminal proportional to the coordinate position of said tactile data input on said display wherein the reading field of view of said data file reader is dynamically positioned to impinge upon optically readable indicia, said data file reader being operably responsive thereto such that reading of the optically readable indicia is initiated thereupon.

85. The hand-held portable data collection system of claim 76 wherein said display is capable of digitizing tactile data input simultaneous with operation of said data file reader such that said tactile data input includes data for adjusting disposition of the reading field of view with respect to the housing of said hand-held portable data terminal proportional to the coordinate position of said tactile data input on said display wherein the reading field of view of said data file reader is dynamically positioned to impinge upon optically readable indicia, said data file reader being operably responsive thereto such that reading of the optically readable indicia is initiated thereupon.

86. A method of operating a hand-held portable data collection system, said hand-held portable data collection system comprising a hand-held portable data collection terminal for reading data in the form of optically readable indicia during utilization thereof in the hand of an operator, said method comprising:
(a) mobilizing a hand-held portable data collection terminal by moving the hand-held portable data collection terminal from a dormant position to an active position wherein said movement is characteristic of action preliminary to reading optically readable indicia such that the optically readable indicia is substantially disposed within the reading field of view of a data file reader integrated with the hand-held portable data collection terminal;
(b) activating the data file reader upon termination of said movement;
(c) thereafter reading the optically readable indicia;
(d) repeating step (c) upon an unsuccessful reading of said optically readable indicia; and;
(e) terminating the reading of said optically readable indicia upon a successful reading thereof.

87. The method according to claim 86 further comprising the step of indicating to the operator, prior to said termination step, the successfulness of said reading step upon a successful reading thereof.

88. A method of operating a hand-held portable data collection system, said hand-held portable data collection system comprising a hand-held portable data collection terminal for reading data in the form of optically readable indicia during utilization thereof in the hand of an operator, said method comprising:
(a) mobilizing a hand-held portable data collection terminal by moving the hand-held portable data collection terminal from a dormant position to an active position wherein said movement is characteristic of action preliminary to reading optically readable indicia such that the optically readable indicia is substantially disposed within the reading field of view of a data file reader integrated with the hand-held portable data collection terminal;
(b) activating the data file reader upon termination of said movement;
(c) thereafter reading the optically readable indicia;
(d) terminating the reading of said optically readable indicia upon a successful reading thereof; and
(e) indicating to the operator the unsuccessfulness of said reading step upon an unsuccessful reading thereof in step (c).

89. The method according to claim 88 wherein said indicating step further comprises indicating to the operator the information relating to the adjustment of the hand-held portable data collection terminal with respect to the optically readable indicia required to obtain a successful reading thereof.

90. A method of operating a hand-held portable data collection system, said hand-held portable data collection system comprising a hand-held portable data collection terminal for reading data in the form of optically readable indicia during utilization thereof in the hand of an operator, said method comprising:
(a) mobilizing a hand-held portable data collection terminal by moving the hand-held portable data collection terminal from a dormant position to an active position wherein said movement is characteristic of action preliminary to reading optically readable indicia such that the optically readable indicia is substantially disposed within the reading field of view of a data file reader integrated with the hand-held portable data collection terminal;
(b) activating the data file reader upon termination of said movement;
(c) thereafter reading the optically readable indicia;
(d) terminating the reading of said optically readable indicia upon a successful reading thereof; and
(e) readjusting the position of the hand-held portable data collection terminal after said reading step upon an unsuccessful reading of the optically readable indicia such that the optically readable indicia is disposed within the reading field of view of the data file reader of the hand-held portable data collection terminal and thereafter repeating said reading step.

91. The method according to claim 89 further comprising the step of readjusting the position of the hand-held portable data collection terminal after said reading step upon an unsuccessful reading of the optically readable indicia, said readjusting step being executed according to the indicated adjustment information such that the optically readable indicia is disposed within the reading field of view of the data file reader of the hand-held portable data collection terminal and thereafter repeating said reading step.

92. A method of operating a hand-held portable data collection system, said hand-held portable data collection system comprising a hand-held portable data collection terminal for reading data in the form of optically readable indicia during utilization thereof in the hand of an operator, said method comprising:
(a) mobilizing a hand-held portable data collection terminal by moving the hand-held portable data collection terminal from a dormant position to an active position wherein said movement is characteristic of action preliminary to reading optically readable indicia such that the optically readable indicia is substantially disposed within the reading field of view of a data file reader integrated with the hand-held portable data collection terminal;
(b) activating the data file reader upon termination of said movement;
(c) thereafter reading the optically readable indicia; and
(d) terminating the reading of said optically readable indicia upon a successful reading thereof;
wherein said activating step includes indicating to the user the execution of said activating step by somatically communicating with the operator by producing tactually detectable vibrations.

93. The method according to claim 92 wherein said reading step includes indicating to the user the execution of said reading step by somatically communicating with the operator by producing tactually detectable vibrations.

94. The method according to claim 92 wherein said terminating step includes indicating to the user the execution of said terminating step by somatically communicating with the operator by producing tactually detectable vibrations.

95. The method according to claim 87 wherein said indicating step includes somatically communicating with the operator by producing tactually detectable vibrations.

96. The method according to claim 88 wherein said indicating step includes somatically communicating with the operator by producing tactually detectable vibrations.

97. The method according to claim 89 wherein said indicating step includes somatically communicating with the operator by producing tactually detectable vibrations.

98. A hand-held portable data collection system for reading data comprising:
(a) a hand-held portable data collection terminal for collecting data; and (b) a somatic communications system operatively integrated with said hand-held portable data collection terminal for tactually communicating with an operator by producing a vibrational signal during hand-held utilization thereof, wherein said vibrational signal is produced by a vibrating device remote from said hand-held portable data collection terminal, said remote vibrating device adapted to be worn by a user.

99. A hand-held portable data collection system for reading data in the form of optically readable indicia during utilization thereof in the hand of an operator, said hand-held portable data collection system comprising:

(a) a hand-held portable data collection terminal for collecting, processing and transferring data, said hand-held portable data collection terminal including a data file reader for reading data encoded as optically readable indicia; and (b) a somatic communications system operatively integrated with said hand-held portable data collection terminal for tactually communicating with the operator by producing a plurality of tactually distinct vibrational signals during hand-held utilization thereof.

100. The hand-held portable data collection system of claim 99 wherein a first vibrational signal is produced to indicate activation of said data file reader, a second vibrational signal is produced to indicate reading of said optically readable indicia, and a third vibrational signal is produced to indicate a successful reading operation, wherein said first, second, and third vibrational signals are tactually distinct.

* * * * *